(12) United States Patent
Ootomo et al.

(10) Patent No.: US 11,526,149 B2
(45) Date of Patent: Dec. 13, 2022

(54) MACHINING COMMAND IMPROVING SYSTEM AND MACHINING COMMAND IMPROVING METHOD

(71) Applicant: FANUC CORPORATION, Yamanashi (JP)

(72) Inventors: Yousuke Ootomo, Yamanashi (JP); Osamu Hanaoka, Yamanashi (JP); Kiwamu Saitou, Yamanashi (JP); Hidehiro Miyajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/897,792

(22) Filed: Jun. 10, 2020

(65) Prior Publication Data

US 2020/0401106 A1 Dec. 24, 2020

(30) Foreign Application Priority Data

Jun. 20, 2019 (JP) .............................. JP2019-114595

(51) Int. Cl.
*G05B 19/4093* (2006.01)

(52) U.S. Cl.
CPC .................. *G05B 19/40938* (2013.01); *G05B 2219/32422* (2013.01); *G05B 2219/35012* (2013.01)

(58) Field of Classification Search
CPC .... G05B 19/40938; G05B 2219/32422; G05B 2219/35012; G05B 19/4097; Y02P 90/02
USPC ........................................................ 700/105
See application file for complete search history.

(56) References Cited

U.S. PATENT DOCUMENTS

| | | | | |
|---|---|---|---|---|
| 6,401,004 B1* | 6/2002 | Yamazaki | ........ | G05B 19/40937 700/195 |
| 6,502,007 B1* | 12/2002 | Kanamoto | ....... | G05B 19/40937 700/173 |
| 2003/0171841 A1* | 9/2003 | Porter | ................ | G05B 19/4097 700/182 |

(Continued)

FOREIGN PATENT DOCUMENTS

JP 2019-8505 1/2019

*Primary Examiner* — Kenneth M Lo
*Assistant Examiner* — Mohammed Shafayet
(74) *Attorney, Agent, or Firm* — Wenderoth, Lind & Ponack, L.L.P.

(57) ABSTRACT

A machining command improving system is in an integrated system in which a CNC machine tool for machining of a machining target into a predetermined machining geometry a machining command and a shared database are connected to each other. The machining command improving system includes: a machining state recording unit that associates requested information indicating a request to be satisfied in the machining when the CNC machine tool performs the machining and state information indicating a state of implementation of the machining, and registers the associated requested information and state information as machining technique information; and a machining method improving unit. The machining method improving unit improves the machining command of the improvement target at the CNC machine tool based on machining technique information registered with the shared database and including requested information conforming at least partially to requested information corresponding to a machining command of an improvement target.

7 Claims, 9 Drawing Sheets

(56) References Cited

U.S. PATENT DOCUMENTS

| | | | |
|---|---|---|---|
| 2006/0079987 A1* | 4/2006 | Cha | G05B 19/4097 |
| | | | 700/173 |
| 2007/0091094 A1* | 4/2007 | Hong | G05B 19/4103 |
| | | | 345/474 |
| 2015/0205296 A1* | 7/2015 | Henning | B24C 1/045 |
| | | | 700/160 |
| 2017/0178015 A1* | 6/2017 | Sato | G06N 7/005 |
| 2017/0357243 A1* | 12/2017 | Takayama | G06N 3/08 |
| 2018/0150060 A1* | 5/2018 | Hsu | G05B 19/40937 |
| 2018/0314227 A1* | 11/2018 | Bretschneider | G05B 19/4097 |
| 2019/0079503 A1* | 3/2019 | Unterguggenberger | G05B 19/41865 |

* cited by examiner

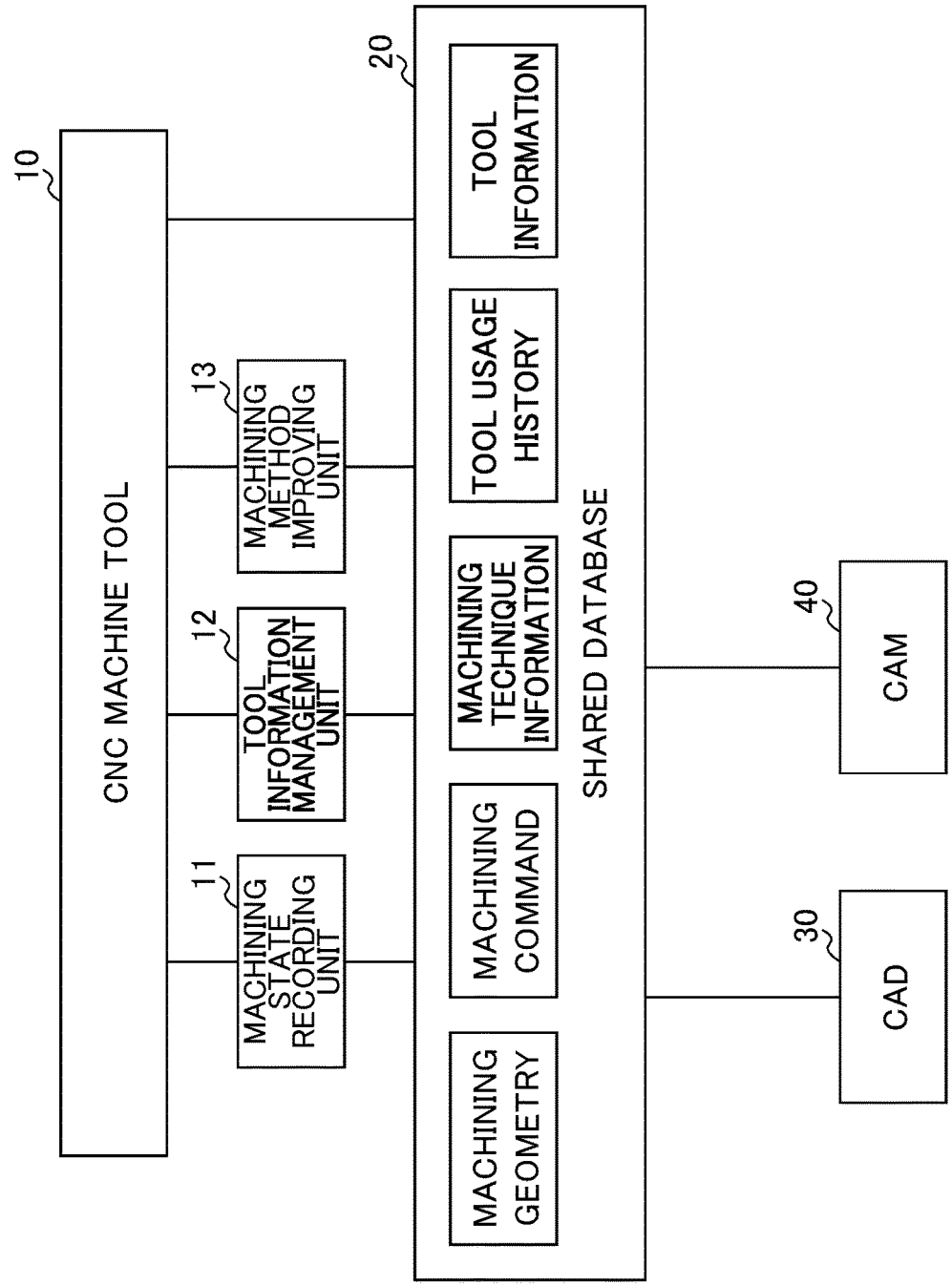

FIG. 2

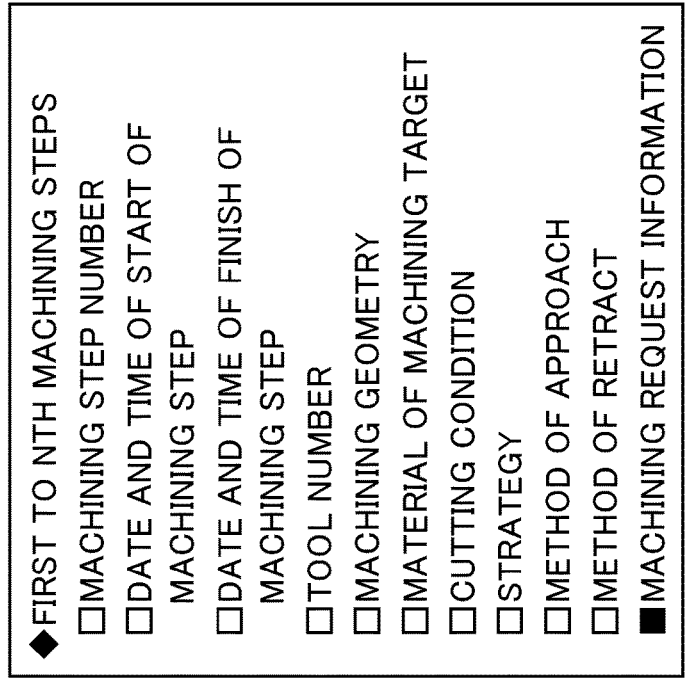
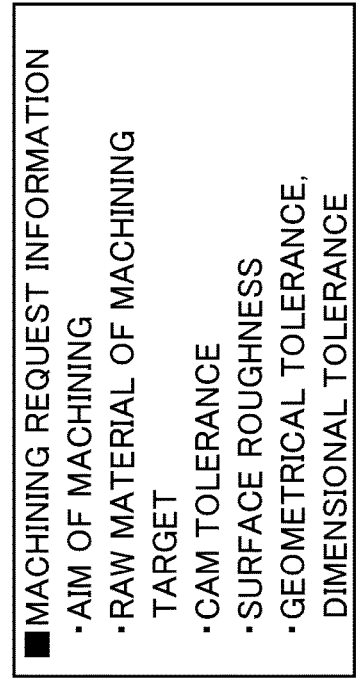
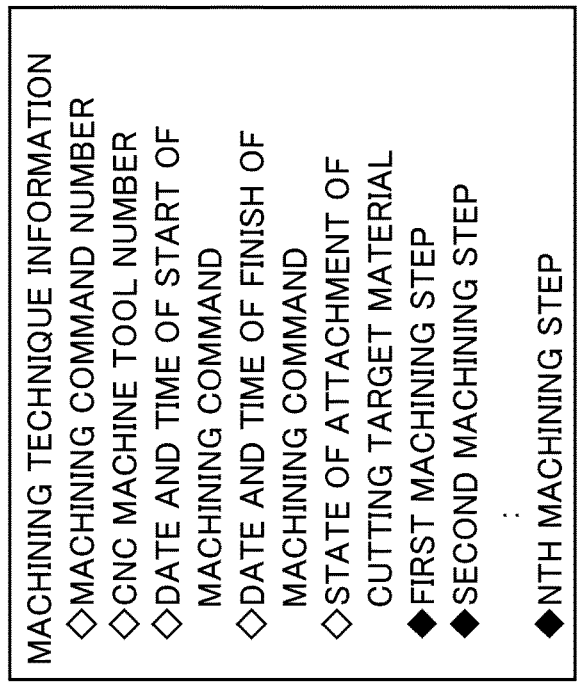

◆ FIRST TO NTH MACHINING STEPS
  □ MACHINING STEP NUMBER
  □ DATE AND TIME OF START OF MACHINING STEP
  □ DATE AND TIME OF FINISH OF MACHINING STEP
  □ TOOL NUMBER
  □ MACHINING GEOMETRY
  □ MATERIAL OF MACHINING TARGET
  □ CUTTING CONDITION
  □ STRATEGY
  □ METHOD OF APPROACH
  □ METHOD OF RETRACT
  ■ MACHINING REQUEST INFORMATION

■ MACHINING REQUEST INFORMATION
  · AIM OF MACHINING
  · RAW MATERIAL OF MACHINING TARGET
  · CAM TOLERANCE
  · SURFACE ROUGHNESS
  · GEOMETRICAL TOLERANCE, DIMENSIONAL TOLERANCE

MACHINING TECHNIQUE INFORMATION
  ◇ MACHINING COMMAND NUMBER
  ◇ CNC MACHINE TOOL NUMBER
  ◇ DATE AND TIME OF START OF MACHINING COMMAND
  ◇ DATE AND TIME OF FINISH OF MACHINING COMMAND
  ◇ STATE OF ATTACHMENT OF CUTTING TARGET MATERIAL
  ◆ FIRST MACHINING STEP
  ◆ SECOND MACHINING STEP
  ⋮
  ◆ NTH MACHINING STEP

FIG. 4

| TOOL USAGE HISTORY |
| --- |
| ◆FIRST TOOL NUMBER |
| ◆SECOND TOOL NUMBER |
| : |
| ◆MTH TOOL NUMBER |

| ◆FIRST TO MTH TOOL NUMBERS |
| --- |
| ☐TOOL EXCHANGE TIME |
| ☐TOTAL TOOL USAGE PERIO |

FIG. 5

| TOOL INFORMATION |
| --- |
| ◆FIRST TOOL NUMBER |
| ◆SECOND TOOL NUMBER |
| : |
| ◆MTH TOOL NUMBER |

| ◆FIRST TO MTH TOOL NUMBERS |
| --- |
| ☐TOOL LIFE |
| ☐TOOL COST PER UNIT TIME |

MACHINING COMMAND IMPROVING SYSTEM AND MACHINING COMMAND IMPROVING METHOD

This application is based on and claims the benefit of priority from Japanese Patent Application No. 2019-114595, filed on 20 Jun. 2019, the content of which is incorporated herein by reference.

BACKGROUND OF THE INVENTION

Field of the Invention

The present invention relates to a machining command improving system and a machining command improving method for improving a machining command.

Related Art

For machining of a workpiece using a computerized numerical control (CNC) machine tool, an appropriate machining command is required to be calculated. Generally, the machining command is calculated using computer-aided design (CAD) and computer-aided manufacturing (CAM). More specifically, a user first designs a machining geometry using CAD. Next, the user calculates a machining command using CAM for machining into the designed machining geometry. Then, the CNC machine tool machines a workpiece on the basis of the calculated machining command. In this way, the user can machine the workpiece into the intended geometry.

A technique for assisting a user in calculating a machining command using CAM is disclosed in patent document 1, for example. According to the technique disclosed in patent document 1, "machining technique information", which is information for assisting in calculating a machining command, is generated on the basis of data resulting from actual machining. The generated machining technique information is output to CAM. A user using the CAM refers to the machining technique information to become capable of calculating a new machining command appropriately.

Patent Document 1: Japanese Unexamined Patent Application, Publication No. 2019-008505

SUMMARY OF THE INVENTION

A general case has been that, when an appropriate machining command is calculated and high-volume production is started under the calculated machining command, the content of this machining command is not reviewed. Hence, the situation has been that, even if machining technique information of a higher quality was accumulated thereafter, the contents of such information had not been reflected in the existing machining command. The reason for this is that reflecting new machining technique information in an existing machining command requires returning to the CAM, which is an upstream step, and subsequent recalculation of a machining command using the CAM, and this imposes a complicated process on the user. Hence, improving a machining command through a simple method has been desired.

(1) One aspect of this disclosure is a machining command improving system in an integrated system in which a CNC machine tool for machining of a machining target into a predetermined machining geometry on the basis of a machining command and a shared database are connected to each other, the machining command improving system being a system for improving the machining command and including: a machining state recording unit that associates requested information indicating a request to be satisfied in the machining when the CNC machine tool performs the machining and state information indicating a state of implementation of the machining, and registers the associated requested information and state information as machining technique information with the shared database; and a machining method improving unit, the machining method improving unit improving the machining command of the improvement target at the CNC machine tool on the basis of machining technique information registered with the shared database and requested information conforming at least partially to requested information corresponding to a machining command of an improvement target.

(2) One aspect of this disclosure is a machining command improving method implemented in an integrated system in which a CNC machine tool for machining of a machining target into a predetermined machining geometry on the basis of a machining command and a shared database are connected to each other, the machining command improving method being a method of improving the machining command and including: a machining state recording step of associating requested information indicating a request to be satisfied in the machining when the CNC machine tool performs the machining and state information indicating a state of implementation of the machining, and registering the associated requested information and state information as machining technique information with the shared database; and a machining method improving step, the machining method improving step improving the machining command of the improvement target at the CNC machine tool on the basis of machining technique information registered with the shared database and requested information conforming at least partially to requested information corresponding to a machining command of an improvement target.

According to each aspect of this disclosure, improving a machining command at the CNC machine tool allows the machining command to be improved in a simpler method than the conventional method.

BRIEF DESCRIPTION OF THE DRAWINGS

FIG. 1 is a block diagram showing a basic configuration according an embodiment of the present invention;

FIG. 2 is a data configuration view showing an example of machining technique information according to the embodiment of the present invention;

FIG. 4 is a data configuration view showing an example of a tool usage history according to the embodiment of the present invention;

FIG. 5 is a data configuration view showing an example of tool information according to the embodiment of the present invention;

DETAILED DESCRIPTION OF THE INVENTION

Figure 3:
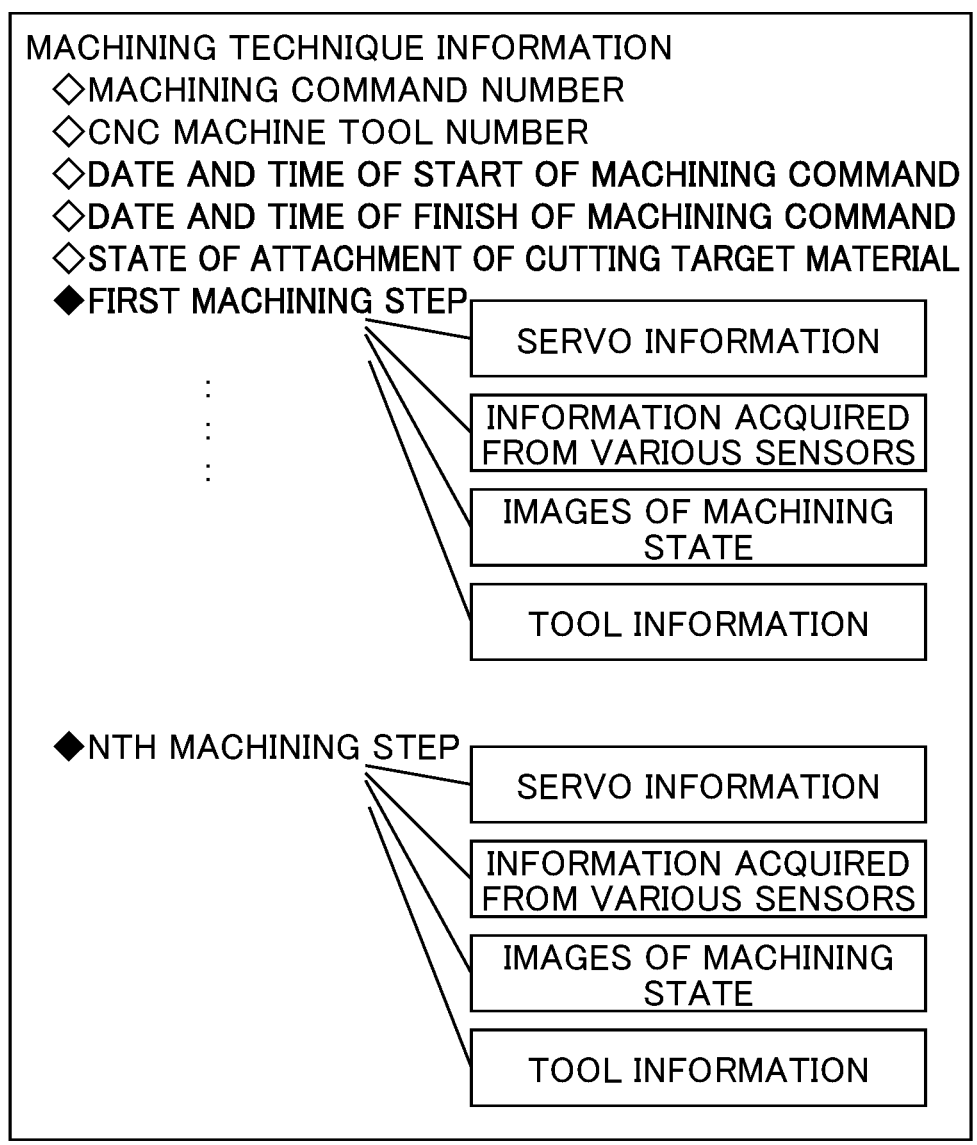
FIG. 3 is a data configuration view showing an example of information added to the machining technique information according to the embodiment of the present invention.

An embodiment of the present invention will be described in detail next by referring to the drawings.

Configuration of Embodiment

As shown in FIG. 1, an integrated system 1 as a machining command improving system of the embodiment includes a CNC machine tool 10, a machining state recording unit 11, a tool information management unit 12, a machining method improving unit 13, a shared database 20, a CAD 30, and a CAM 40.

The outline of the integrated system 1 having the foregoing configuration will be described briefly. In the integrated system 1, a machining command is calculated using the CAD 30 and the CAM 40. In the integrated system 1, machining is performed continuously (namely, high-volume production is given) using the CNC machine tool 10 on the basis of the calculated machining command. Further, in the integrated system 1, machining technique information of higher quality is accumulated in the shared database 20 on the basis of a state of the continuous machining. Then, in the integrated system 1, the machining command is improved at the CNC machine tool 10 on the basis of the accumulated machining technique information.

As described above, in the integrated system 1, new machining technique information can be reflected in an existing machining command without the need of returning to the CAM 40, unlike in the conventional cases. Namely, as a machining command is improved at the CNC machine tool 10, the integrated system 1 allows improvement of the machining command in a simpler method than the conventional method.

Each device for realizing the foregoing process will be described in detail next. The CAD 30 is a device that assists a user in designing a machining geometry. The CAM 40 is a device that assists in calculating a machining command for machining a workpiece as a machining target into the machining geometry designed by the CAD 30. The CNC machine tool 10 is a numerical controller equipped with a machine tool that performs machining of the machining target on the basis of the machining command calculated by the CAM 40. The specific configurations and functions of these devices are well known to a person skilled in the art, so that they will not be described in detail.

The shared database 20 is a shared database connected to each the CAD 30, the CAM 40, and the CNC machine tool 10 (including the machining state recording unit 11, the tool information management unit 12, and the machining method improving unit 13) in a manner allowing reading and writing from and into the shared database 20. Various types of information can be shared among the CAD 30, the CAM 40, and the CNC machine tool 10 by causing the CAD 30, the CAM 40, and the CNC machine tool 10 to transfer information to and from each other through the shared database 20. As shown in FIG. 1, for example, information stored in the shared database 20 includes a machining geometry, machining technique information, a machining command, a tool usage history, and tool information. These pieces of information will be described in detail later by referring to the data configuration views of FIGS. 2, 3, and 4.

The machining state recording unit 11, the tool information management unit 12, and the machining method improving unit 13 are units responsible for processes specific to the integrated system 1. More specifically, each time the CNC machine tool 10 executes a machining command, the machining state recording unit 11 generates machining technique information. Further, the machining state recording unit 11 stores the generated machining technique information into the shared database 20. The process performed by the machining state recording unit 11 will be described in detail later by referring to the sequence chart of FIG. 5.

The tool information management unit 12 manages information about a tool used for machining by the CNC machine tool 10. For example, the tool information management unit 12 manages the tool information and the tool usage history stored in the shared database 20. The process performed by the tool information management unit 12 will be described in detail later by referring to the sequence chart of FIG. 6.

The machining method improving unit 13 improves a machining command at the CNC machine tool 10 on the basis of the machining technique information accumulated in the shared database 20. The process performed by the machining method improving unit 13 will be described in detail later by referring to the sequence chart of FIG. 7.

The devices included in the embodiment have been described above. Each of these devices includes an arithmetic processing unit such as a central processing unit (CPU). Each of these devices further includes an auxiliary storage device that may be a hard disk drive (HDD) storing various control programs such as application software and an operating system (OS), and a main storage device that may be a random access memory (RAM) for storing data necessitated temporarily by the arithmetic processing unit in executing programs.

In each of these devices, the arithmetic processing unit reads out the application software and/or OS from the auxiliary storage device, and performs arithmetic processing on the basis of the read application software and/or OS, while expanding the read application software and/or OS in the main storage device. On the basis of the results of this arithmetic processing, various types of hardware provided in each of these devices are controlled in this way, the functions of the embodiment are realized. In other words, the embodiment is realized by causing hardware and software to work cooperatively.

Like the foregoing devices, each the machining state recording unit 11, the tool information management unit 12, and the machining method improving unit 13 are realized at the CNC machine tool 10. Being realized at the CNC machine tool 10 includes not only cases of being realized by causing hardware and software of the CNC machine tool 10 to work cooperatively, but also cases of being realized by causing hardware and software of a different device (not shown) and the hardware and the software of the CNC machine tool 10 to work cooperatively.

Details of Each Piece of Information Stored in Shared Database 20

Each piece of information stored in the shared database 20 will be described in detail by referring to the drawings. As shown in FIG. 1, for example, information stored in the shared database 20 includes a machining geometry, machining technique information, a machining command, a tool usage history, and tool information.

The "machining geometry" is the geometry of a machined workpiece designed by the CAD 30, as described above. As an example, the machining geometry is defined by the type of geometry and specific designations of the partial angle, size, etc. of the geometry. For example, the geometry types include a plane, a hole, a groove, a pocket, a boss, etc. The specific designations include a plurality of specific designations that may be "a depth of 30 mm," "a conical hole bottom shape," "a bottom point angle of 118°," and "a hole diameter of 10.0 mm," for example, if the geometry type is a hole.

As described above, the "machining command" is information for implementation of machining calculated by the CAM 40 and improved at the CNC machine tool 10. The machining command includes settings of machining contents such as a tool number, machining geometry (machining feature), a material of a machining target, a cutting condition, strategy, a method of approach, or a method of retract, for example. The machining command further includes "machining request information" described in detail later, which is information indicating a request to be satisfied in machining. In the embodiment, an example of the machining request information includes the aim of a user during the machining, for example.

As described above, the "machining technique information." is information to be referred to by a user in calculating a machining command or used for improvement at the CNC machine tool 10. The machining technique information is managed by the machining state recording unit 11. The machining technique information is used by the machining method improving unit 13. Like a machining command, the machining technique information includes settings of machining contents. Like a machining command, the machining technique information includes the machining request information. The machining technique information further includes information about a state in which machining is being performed by the CNC machine tool 10 on the basis of a machining command and about the cost of a tool used in the machining by the CNC machine tool 10.

The "tool usage history" is information about the usage history of the tool used in machining by the CNC machine tool 10. Like the tool information, the tool usage history is managed by the tool information management unit 12. The tool usage history includes tool exchange time and a tool usage period.

The "tool information" is information about the cost of a tool used in the machining by the CNC machine tool 10. The tool information is managed by the tool information management unit 12. The tool information includes information for selecting a tool such as the tool classification (type), tool length, or tool radius of each tool. The tool information further includes information about each tool such as the life of a tool and the cost of the tool such as tool cost per unit time.

The data configuration of the machining technique information will be described next by referring to FIGS. 2 and 3. As shown in FIG. 2, the machining technique information is data having a hierarchical structure. More specifically, the machining technique information in a higher layer includes information indicating a machining command number, a CNC machine tool number, date and time of start of a machining command, date and time of finish of the machining command, and a state of attachment of a cutting target material, and information about one or a plurality of machining steps in the case where the machining step is a unit of machining one type of machining geometry using one type of tool. The information about the machining steps shown in FIG. 2 includes information about steps from a first machining step to an Nth (N is an arbitrary natural number) machining step.

Information about each of the steps from the first machining step to the Nth machining step in a middle layer includes the following for one machining step or each of a plurality of machining steps: items relating to management such as a machining step number, date and time of start of a machining step, and date and tame of finish of the machining step; information about machining contents such as a tool number, a machining geometry, a cutting condition, strategy, a method of approach, and a method of retract; and machining request information.

The machining request information in a lower layer includes the aim of machining, a material of a machining target, CAM tolerance, surface roughness, geometrical tolerance, and dimensional tolerance.

Each of the foregoing pieces of information and the hierarchical structures are shown merely as examples, and information included in the machining technique information and the hierarchical structure of the machining technique information of the embodiment are not limited to these exemplary contents. As an example, the machining contents in the middle layer may further include information such as a machining step name, a spindle rotation number, a cutting feedrate, a feed amount of one tool edge, a depth of a cut, a cutting width, an effective function, a tool path, etc. Some of the exemplary pieces of information may be omitted.

In the embodiment, a user first calculates a machining command for each machining step by describing machining contents (corresponding to the foregoing information in the middle layer) and machining request information (corresponding to the foregoing information in the lower layer) using the CAM 40. Then, the machining state recording unit 11 generates the machining technique information during execution of the calculated machining command.

Information such as an identification number included in the higher layer of the machining technique information is general log information, and information indicating machining contents included in the middle layer is information generally described at the time of calculation of a machining command. Thus, these pieces of information will not be described in detail. The machining request information included in the lower layer includes information specific to the embodiment, so it will be described in detail.

The machining request information is described by a user in a machining command when the user calculates the machining command using the CAM 40. The contents of the machining request information may be described through input of an arbitrary character string as text by the user or through selection by the user from character strings prepared in advance. Each piece of information in the machining request information will be described next.

The aim of machining is information indicating a request for machining from the user having calculated the machining command. Examples of the aim of machining include total machining cost minimization, machining man-hour minimization, tool cost minimization, tool nose exchange frequency minimization, and machining reliability maximization.

The material of a machining target is a material of a machining target (workpiece) as a target of machining under the machining command. Examples of the material of the machining target include aluminum, brass, stainless steel, iron, and titanium.

The CAM tolerance is an accurate allowable value when implementing 3D machining such as free-form machining under the machining command. The CAM tolerance is expressed as a value units of [mm], for example. The surface roughness is a state of asperities on a machining surface machined under the machining command. The surface roughness is expressed as arithmetic mean roughness as a value in units of [Ra], for example.

The geometrical tolerance is a difference allowed for a geometrcally correct geometry or position. The dimensional tolerance is a difference allowed for dimension. The geometrical tolerance and the dimensional tolerance are expressed as values in units of [mm] indicating allowable differences, for example.

Information indicating a state during execution of the machining command and the tool information associated with the machining technique information by the machining state recording unit 11 will be described next by referring to FIG. 3. As shown in FIG. 3, information indicating a state of execution of the machining command and associated with the machining technique information for each machining step includes data such as data information from various sensors, servo information, and motion images captured during machining. The tool information is further associated with the machining technique information.

Examples of the data information from various sensors include a deformation amount of a cutting target material, air temperature information, machine temperature information, coolant temperature information, acceleration sensor data, automatic emission (AE) sensor data, and sound sensor data.

Examples of the servo information include information about a servo motor such as a spindle motor current value, each feed axis motor current value, a spindle motor load, each feed axis motor load, a spindle override, and a feed axis speed override.

Examples of the motion images captured during machining include motion images of a machining target, a tool or a machining point captured during implementation of the machining.

Examples of the tool information include tool cost per unit time about a tool used for machining and the life of the tool.

The data configuration of the tool usage history will be described next by referring to FIG. 4. As shown in FIG. 4, the tool usage history is data having a hierarchical structure. More specifically, the tool usage history in a higher layer includes information about each tool. The information about each tool shown in FIG. 4 includes information about tool numbers from a first tool number to an Mth (M is an arbitrary natural number) tool number.

Each of the pieces of information from the information about the first tool number to the information about the Mth tool number in a lower layer includes tool exchange time and a total tool usage period. The tool exchange time is the time when a tool was exchanged. The total tool usage period is a period when a tool was used for machining after exchange of the tool. These pieces of information are values actually measured during machining by the CNC machine tool 10 and are updated appropriately by the tool information management unit 12.

The data configuration of the tool information will be described next by referring to FIG. 5. As shown in FIG. 5, the tool information is data having a hierarchical structure. More specifically, the tool information in a higher layer includes information about each tool. The information about each tool shown in FIG. 5 includes information about tool numbers from a first tool number to an Mth (M is an arbitrary natural number) tool number.

Each of the pieces of information from the information about the first tool number to the information about the Mth tool number in a lower layer includes tool life and tool cost per unit time. The tool life is a period when a tool was available for use in machining after exchange of the tool. The tool cost per unit time is tool cost incurred by the usage of a tool per unit time (in units of one minute, for example).

Each time the tool usage history is updated, these pieces of information are calculated and updated by the tool information management unit 12. Regarding a tool to be subjected to exchange of a tool nose, for example, at a predetermined cycle due to wear resulting from machining, the life of this tool is calculated as a difference between time of the most recent tool exchange and time of tool exchange previous to the most recent exchange and is then updated. In another case, regarding a tool not required to be exchanged within a certain period after purchase, the life of this tool is calculated as the same period as a total tool usage period determined most recently and then updated.

The tool cost per unit time is calculated by dividing a tool unit price by tool life and then updated. If a unit time is one minute and if the life of a tool available at a unit price of 100 yen is 300 minutes, for example, the tool cost of this tool per unit time is calculated as "100/300=0.33" and thus determined to be 0.33 yen.

This tool unit price is registered in advance with the shared database 20. If one tool has a plurality of parts to be exchanged, the unit price of this tool is calculated by multiplying the unit price of one of these parts and the number of these parts. If the unit price of one part is 100 yen and if there are four parts to be exchanged, for example, the tool unit price is calculated as "100×4=400" and thus determined to be 400 yen.

If a part to be exchanged becomes available for use on several occasions by being exchanged, a tool unit price is calculated by dividing the unit price of such a part by the number of these occasions. In the case of a triangular insert chip with three edges on the three sides, for example, this insert chip is available for use on three occasions by rotating and reattaching (namely, by exchanging) the edges. For this reason, if the unit price of this insert chip is 100 yen, for example, a tool unit price is calculated as "100/3=33" and thus determined to be 33 yen. If one tool has a plurality of parts to be exchanged and the parts to be exchanged each become available for use on several occasions by being exchanged, a tool unit price is calculated by combining the foregoing calculations.

Each of the pieces of information stored in the shared database 20 is as described above. These pieces of information are merely shown as examples and different information may be stored further into the shared database 20. Examples of information to be stored as part of the machining technique information include electric power charges calculated from the amount of electrical energy consumed for machining, a machining period and a tool usage period in each machining step, resource information about a machine tool, etc., and information about the incidence of failure or trouble occurring during machining under a machining command.

Process of Generating and Storing Machining Technique Information

Figure 6:
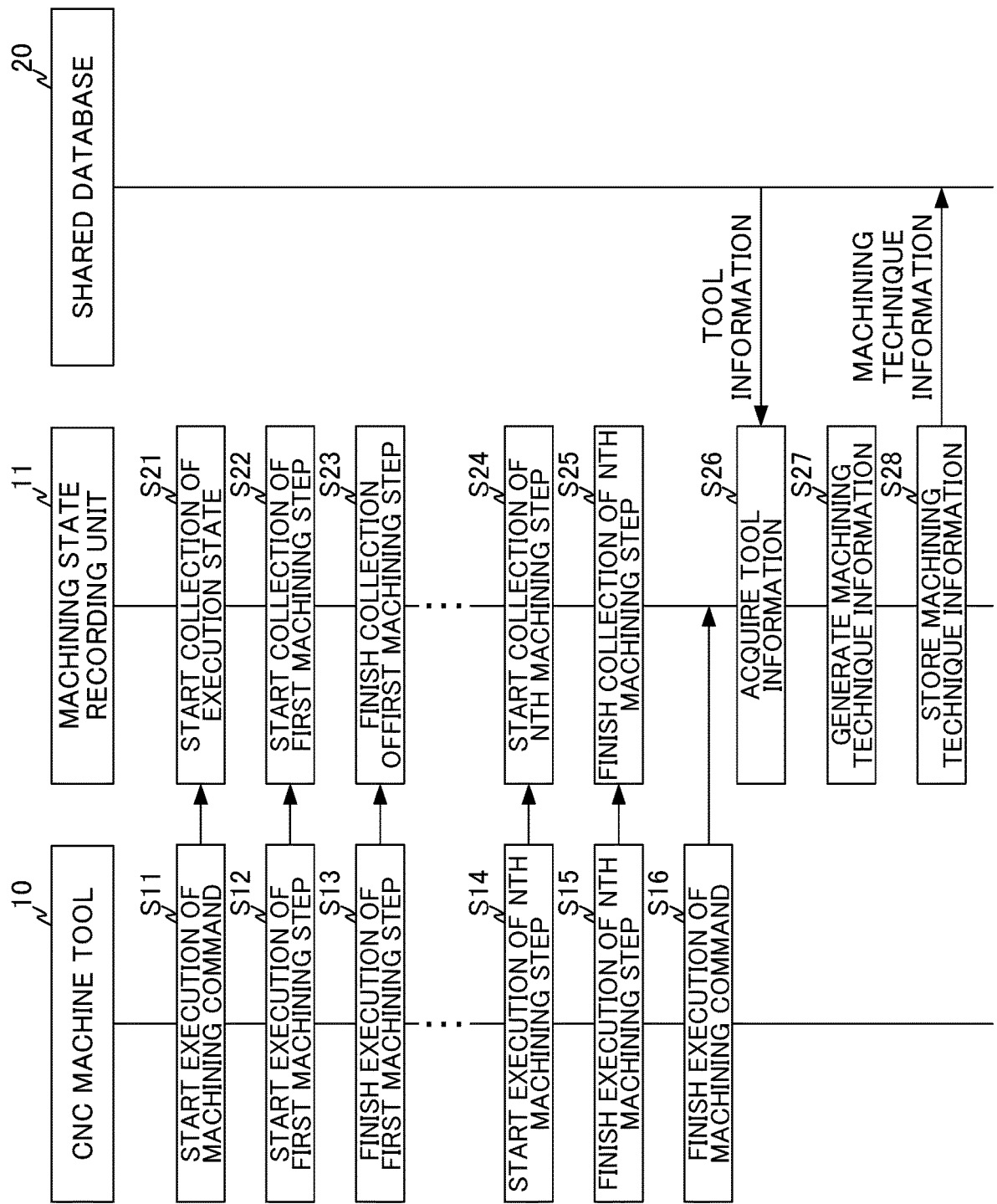
FIG. 6 is a sequence chart showing the flow of a process of generating and storing machining technique information according to the embodiment of the present invention.

A process of generating and storing machining technique information performed by the machining state recording unit 11 will be described next by referring to the sequence chart of FIG. 6. Each time a machining command is executed by the CNC machine tool 10, the machining state recording unit 11 generates and stores machining technique information. More specifically, the CNC machine tool 10 outputs servo information and data information from various sensors acquired during execution of a machining command to the machining state recording unit 11. Further, a camera (not shown) captures images during execution of the machining command and outputs the captured images to the machining state recording unit 11. The machining state recording unit 11 collects these pieces of information (the servo information, the data information from various sensors, and the captured images showing a machining state), and associates the collected pieces of information with information included in the machining command such as machining contents, the aim of machining, etc., thereby generating machining technique information.

In step S11, the CNC machine tool 10 starts implementation of machining on the basis of a machining command. Further, the CNC machine tool 10 notifies the machining state recording unit 11 of the start of implementation of the machining. After the machining state recording unit 11 is notified of the start of implementation of the machining, the machining state recording unit 11 starts collection of information indicating a state of execution of the machining command for generating machining technique information in step S21. More specifically, the machining state recording unit 11 starts collection of the foregoing data information from various sensors, servo information, and motion images captured during the machining. As described above, these pieces of information are collected for each machining step.

In step S12, the CNC machine tool 10 starts execution of a first machining step on the basis of the machining command. In step S22, the machining state recording unit 11 starts collection of information indicating a state of execution of the first machining step.

In step S13, the CNC machine tool 10 finishes execution of the first machining step. In step S23, the machining state recording unit 11 finishes collection of the information indicating the state of execution of the first machining step.

Next, the CNC machine tool 10 and the machining state recording unit 11 repeat the same processes in step S12, step S13, step S22, and step S23 for each machining step. This repetition is not shown in FIG. 6.

Then, in step S14, the CNC machine tool 10 starts execution of an Nth machining step. In step S24, the machining state recording unit 11 starts collection of information indicating a state of execution of the Nth machining step.

In step S15, the CNC machine tool 10 finishes implementation of the machining on the basis of the machining command. The CNC machine tool 10 notifies the machining state recording unit 11 of the finish of the machining. After the machining state recording unit 11 is notified of the finish of the machining, the machining state recording unit 11 finishes collection of the information indicating the state of execution of the machining command in step S25.

In step S26, the machining state recording unit 11 acquires tool information about a tool having been used for the machining in each of the foregoing steps (namely, tool life and tool cost per unit time) from the shared database 20. In step S27, the machining state recording unit 11 generates machining technique information on the basis of the information collected in each of the foregoing steps, the contents of the machining command executed in each of the foregoing steps by the CNC machine tool 10, and the tool information about the tool used in each of the foregoing steps.

In step S28, the machining state recording unit 11 stores the machining technique information generated in step S27 into the shared database 20. Then, this process is finished. As a result of the foregoing operation, each time the CNC machine tool 10 executes a machining command, machining technique information is generated and accumulated in the shared database 20.

Process of Updating Tool Usage History and Tool Information

Figure 7:
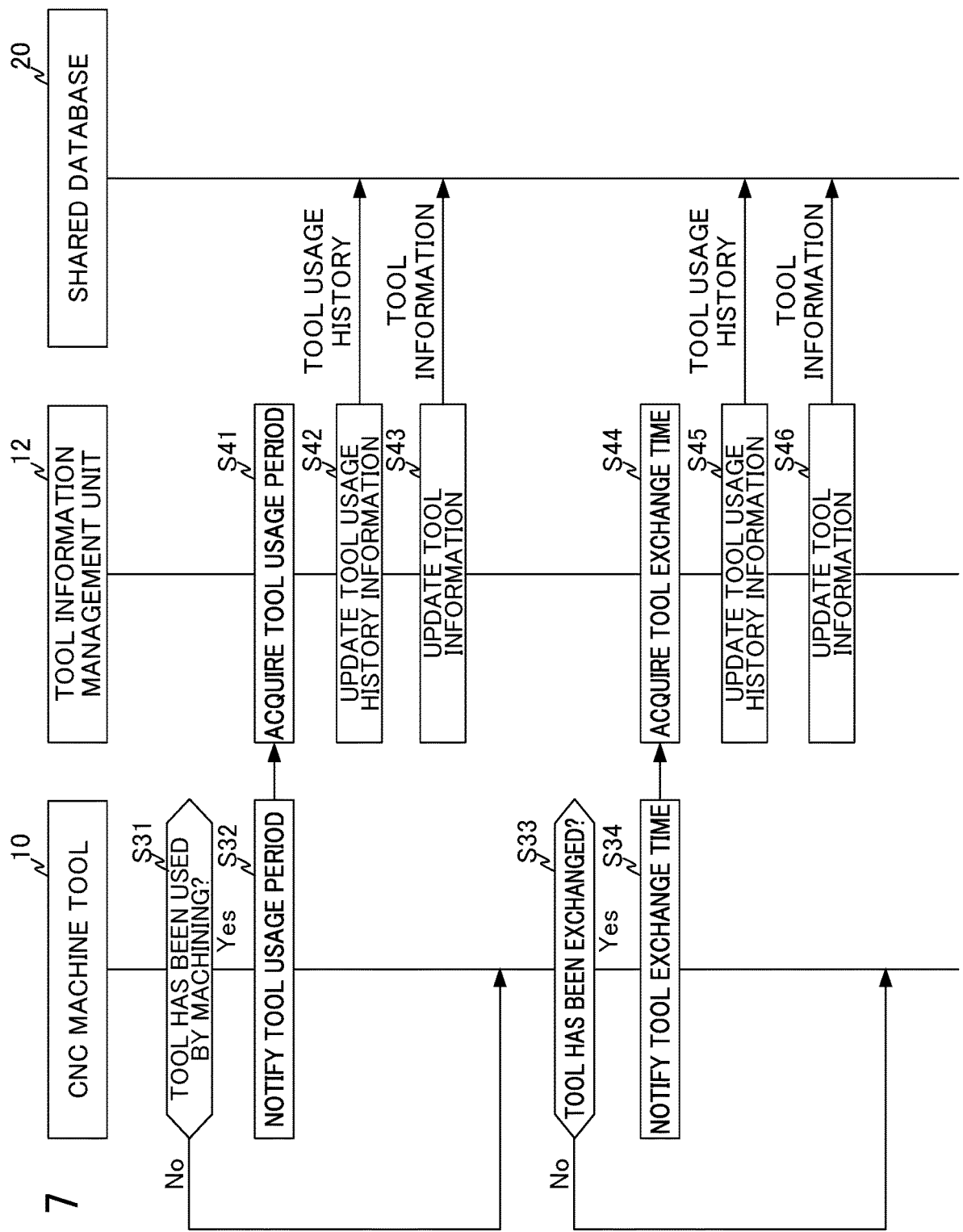
FIG. 7 is a sequence chart showing the flow of a process of updating tool usage history and tool information according to the embodiment of the present invention.

A process of updating a tool usage history and tool information performed by the tool information management unit 12 will be described next by referring to the sequence chart of FIG. 7. The tool information management unit 12 updates a tool usage history and tool information if the CNC machine tool 10 executes a machining command and uses a tool, or if a tool is exchanged.

In step S31, the CNC machine tool 10 judges whether a machining command has been executed and a tool has been used. If a tool has been used, a judgment Yes is made in step S31 and the process proceeds to step S32. If a tool has not been used, a judgment No is made in step S31 and the process proceeds to step S33.

In step S32, the CNC machine tool 10 notifies a usage period of each tool having been used in each step in the machining command.

In step S41, the tool information management unit 12 acquires the notified tool usage period. In step S42, the tool information management unit 12 updates a total tool usage period in a tool usage history stored in the shared database 20 on the basis of the acquired tool usage period.

In step S43, the tool information management unit 12 updates tool life or tool cost per unit time in tool information stored in the shared database 20 on the basis of the updated total tool usage period.

In step S33, the CNC machine tool 10 judges whether a tool has been exchanged. If a tool has been exchanged, a judgment Yes is made in step S33 and the process proceeds to step S34. If a tool has not been exchanged, a judgment No is made in step S33 and then this process is finished.

In step S34, the CNC machine tool 10 notifies tool exchange time of the exchanged tool. In step S44, the tool information management unit 12 acquires the notified tool exchange time. In step S45, the tool information management unit 12 updates tool exchange time in the tool usage history stored in the shared database 20 on the basis of the acquired tool exchange time.

In step S46, the tool information management unit 12 updates the tool life or the tool cost per unit time in the tool information stored in the shared database 20 on the basis of the updated tool exchange time. Then, this process is finished. As a result of the foregoing operation, if the CNC machine tool 10 executes a machining command and uses a tool or if a tool is exchanged, a tool usage history and tool information are updated.

Process of Improving Machining Command

Figure 8:
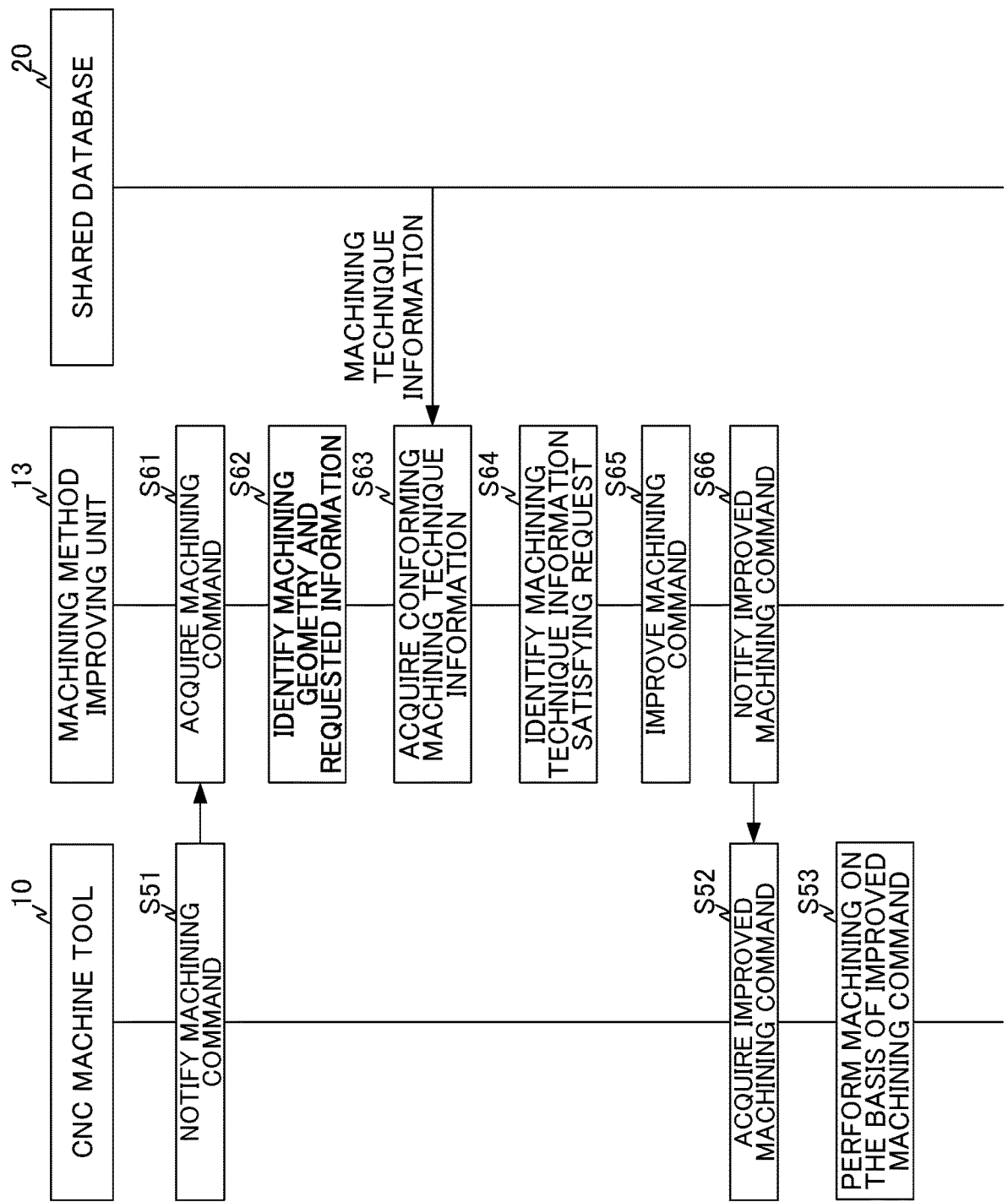
FIG. 8 is a sequence chart showing the flow of a process of improving a machining command according to the embodiment of the present invention.

A process of improving a machining command performed by the machining method improving unit 13 will be described next by referring to the sequence chart of FIG. 8. The machining method improving unit 13 performs the process of improving a machining command before the CNC machine tool 10 performs machining on the basis of the machining command.

The process of improving a machining command may be performed for each implementation of machining, or may be performed at a predetermined cycle (for example, each time machining is performed a predetermined number of times or each time a predetermined period of time has passed). Such timing of performing the process of improving a machining command can be set using a flag for determining timing. This makes it possible to improve a machining command automatically to coincide with timing set on the basis of the flag without involving operation by a user. Alternatively, such a flag may not be set and a machining command may be improved manually on the basis of instructive operation through the CNC machine tool 10.

In step S51, the CNC machine tool 10 notifies the machining method improving unit 13 of a machining command for machining to be performed next on the basis of a flag (in another case, on the basis of instructive operation from a user).

In step S61, the machining method improving unit 13 acquires the notified machining command. In step S62, the machining method improving unit 13 identifies a machining geometry and machining request information included in the acquired machining command.

In step S63, the machining method improving unit 13 acquires all pieces of machining technique information, each including a machining geometry at least partially the same as the identified machining geometry and conforming at least partially to the identified machining request information. A judgement criterion for "being the same at least partially" will be described next. Regarding a machining geometry, the machining geometry is defined by the type of a geometry and specific designations of a partial angle, size, etc. of the geometry, as described above. In the embodiment, as long as there is conformity to the type of the identified geometry, "a machining geometry" is judged to be "the same at least partially," even in the absence of conformity in terms of specific settings. Regarding machining technique information, the machining technique information includes an aim of machining, a raw material of a machining target, CAM tolerance, etc., as described above. In the embodiment, as long as there is conformity in terms of an aim of machining, "machining technique information" is judged to be "the same at least partially," even in the absence of conformity in terms of other machining request information.

In step S64, the machining method improving unit 13 determines the machining technique information from the acquired pieces of machining technique information achieving the highest satisfaction of a request in the machining request information (here, an aim of machining, for example) conforming to the machining command. A criterion for judging whether the request is satisfied differs according to the contents of the machining request information. The judgment criterion will be described in detail together with an exemplary aim of machining.

First Example: If Aim of Machining is Total Machining Cost Minimization

If an aim of machining in machining request information is "total machining cost minimization," for example, machining technique information resulting in minimization of "(machining period×charge amount per unit time)+(tool usage period×tool cost per unit time)+energy cost" is determined to be the machining technique information achieving the highest satisfaction of the request in the machining request information. The tool cost per unit time is included in the machining technique information. The machining period and the tool usage period can be calculated using a tool point move distance and a tool point feedrate. The tool point move distance is calculated by extracting machining technique information conforming at least partially to each an identified machining geometry and identified machining request information, and by applying a machining method according to the conforming machining technique information to the identified machining geometry. The machining period and the tool usage period are both calculated as "(tool point move distance)/(tool point feedrate)." The charge amount is the cost of usage of the CNC machine tool 10 and can be calculated by dividing the purchase price of the CNC machine tool 10 by the durable life of the CNC machine tool 10. The energy cost is electric power charges for machining and is included in the machining technique information.

Second Example: If Aim of Machining is Machining Man-Hour Minimization

If an aim of machining in machining request information is "machining man-hour minimization," for example, machining technique information resulting in minimization of "(tool point move distance)/(tool point feedrate)" is determined to be the machining technique information achieving the highest satisfaction of the request in the machining request information. The tool point move distance is calculated by extracting machining technique information conforming at least partially to each an identified machining geometry and identified machining request information, and by applying a machining method according to the conforming machining technique information to the identified machining geometry. The tool point feedrate is included in the machining technique information.

Third Example: If Aim of Machining is Tool Cost Minimization

If an aim of machining in machining request information is "tool cost minimization," for example, machining technique information resulting in minimization of "(machining period)×(tool cost per unit time)" is determined to be the machining technique information achieving the highest satisfaction of the request in the machining request information. The machining period can be calculated using a tool point move distance and a tool point feedrate. The tool point move distance is calculated by extracting machining technique information conforming at least partially to each an identified machining geometry and identified machining request information, and by applying a machining method according to the conforming machining technique information to the identified machining geometry. The machining period is calculated as "(tool point move distance)/(tool point feedrate)." The tool cost per unit time is included in the machining technique information.

Fourth Example: If Aim of Machining is Tool Nose Exchange Frequency Minimization If an aim of machining in machining request information is "tool nose exchange frequency minimization," for example, machining technique information resulting in minimization of "(tool usage period)/(tool life)" is determined to be the machining technique information achieving the highest satisfaction of the request in the machining request information. The tool usage period can be calculated using a tool point move distance and a tool point feedrate. The tool point move distance is calculated by extracting machining technique information conforming at least partially to each an identified machining geometry and identified machining request information, and by applying a machining method according to the conforming machining technique information to the identified machining geometry. The machining period is calculated as "(tool point move distance)/(tool point feedrate)." The tool life is included in the machining technique information.

Fifth Example: If Aim of Machining is Machining Reliability Maximization

If an aim of machining in machining request information is "machining reliability maximization," for example, machining technique information resulting in minimization of "the incidence of failure or trouble occurring during machining under a machining command" is determined to be the machining technique information achieving the highest satisfaction of the request in the machining request information. The incidence of failure or trouble occurring during machining under the machining command is included in the machining technique information.

The machining method improving unit 13 determines the machining technique information from the acquired pieces of machining technique information achieving the highest satisfaction of a request in the machining request information conforming to the machining command on the basis of the judgment criterion differing according to the foregoing aims of machining.

In step S65, the machining method improving unit 13 improves the machining command by replacing the contents of the machining command with the contents of the machining technique information achieving the highest satisfaction of the request in the machining request information. In this way, the machining command can be improved to a machining command usable for achieving the highest satisfaction of the request in the machining request information. The foregoing processes from step S62 to step S65 are performed for each machining step in the machining command.

In step 66, the machining method improving unit 13 notifies the improved machining command to the CNC machine tool 10. In step S52, the CNC machine tool 10 acquires the notified improved machining command.

In step S53, the CNC machine tool 10 performs machining on the basis of the improved machining command. Then, this process is finished. As a result of the foregoing operation, a machining command for machining to be performed next can be improved to a machining command usable for achieving the highest satisfaction of a request in machining request information on the basis of a flag (or on the basis of instructive operation from a user).

Effect of Embodiment

According to the foregoing embodiment, new machining technique information can be reflected in an existing machining command without the need of returning to the CAM 40 unlike in the conventional cases. Namely, as a machining command is improved at the CNC machine tool 10, the integrated system 1 allows improvement of the machining command in a simpler method than the conventional method.

Operation at the CAM 40 such as machining command editing is a professional technique depending on the CAM 40 and, in not a few cases, such operation cannot be handled by a machining operator. In this regard, according to the embodiment, editing (namely, improvement) of a machining command can be completed at the CNC machine tool 10. Thus, even if a user is a machining operator without a professional technique depending on the CAM 40, for example, the user is still allowed to do editing. Additionally, in many cases, the machining operator is a person in charge of the CNC machine tool 10 itself and thus has many chances of operating the CNC machine tool 10 as an actual machine. Thus, editing can be done easily and daily.

Pieces of information such as tool life, tool cost per unit time, etc. cannot be regarded as correct information unless they are given certain degrees of actual achievement. Hence, regarding a machining command with little actual achievement in conventional cases, these pieces of information including tool life have not been prepared sufficiently and thus have not been available for improving the machining command. In this regard, the embodiment allows update of these pieces of information including tool life at the CNC machine tool 10 and allows accumulation of related machining technique information. By doing so, the presence of better machining technique responsive to machining request information is rediscovered in the shared database 20 and such machining technique becomes available for improvement. Namely, according to the embodiment, accumulating machining technique information allows usage of the shared database 20 as a more beneficial database.

The accumulated machining technique information is usable for a purpose other than the foregoing improvement. For example, if a user is to calculate a new machining command using the CAM 40, the user can calculate the machining command newly for machining of a machining target into a machining geometry by referring to the machining technique information read by the CAM 40.

Cooperative Operation of Hardware and Software

Each device and each unit of the foregoing integrated system can be realized by hardware, software, or a combination of hardware and software. A machining technique management method implemented by each device and each unit of the foregoing integrated system can also be realized by hardware, software, or a combination of hardware and software. Being realized by software means being realized by reading and execution of a program by a computer.

The program can be stored using various types of non-transitory computer-readable media and can be supplied to the computer. The non-transitory computer-readable media include various types of tangible storage media. Examples of the non-transitory computer-readable media include a magnetic storage medium (a flexible disk, magnetic tape, or a hard dash drive, for example), a magneto-optical storage medium (a magneto-optical disk, for example), a CD read-only memory (CD-ROM), a CD-R, a CD-R/W, and a semiconductor memory (a mask ROM, a programmable ROM (PROM), an erasable PROM (EPROM), a flash ROM, or a random access memory (RAM), for example). The program can also be supplied to the computer using various types of transitory computer-readable media. Examples of the transitory computer-readable media include electrical signals, optical signals, and electromagnetic waves. The transitory computer-readable media can be used for supplying the program to the computer via wired communication paths such as electric wires and optical fibers, or wireless communication paths.

While the foregoing embodiment is a preferred embodiment of the present invention, the scope of the present invention is not limited only to the foregoing embodiment but the present invention can be carried out in embodiments including various changes within a range not deviating from the substance of the present invention.

First Modification

In the foregoing embodiment, all pieces of machining technique information generated by the machining state recording unit 11 are stored into the shared database 20. Then, the machining method improving unit 13 determines the machining technique information most usable for achieving the highest satisfaction of a request in machining request information from multiple pieces of machining technique information at the time of improvement of a machining command, and then improves the machining command. However, this is not the only configuration but a different configuration is further applicable.

For example, of multiple pieces of machining technique information generated by the machining state recording unit 11, only machining technique information most usable for achieving the highest satisfaction of a request in machining request information may be stored into the shared database 20. This allows the machining method improving unit 13 to omit the process of determining the machining technique information most usable for achieving the highest satisfaction of the request.

Figure 9:
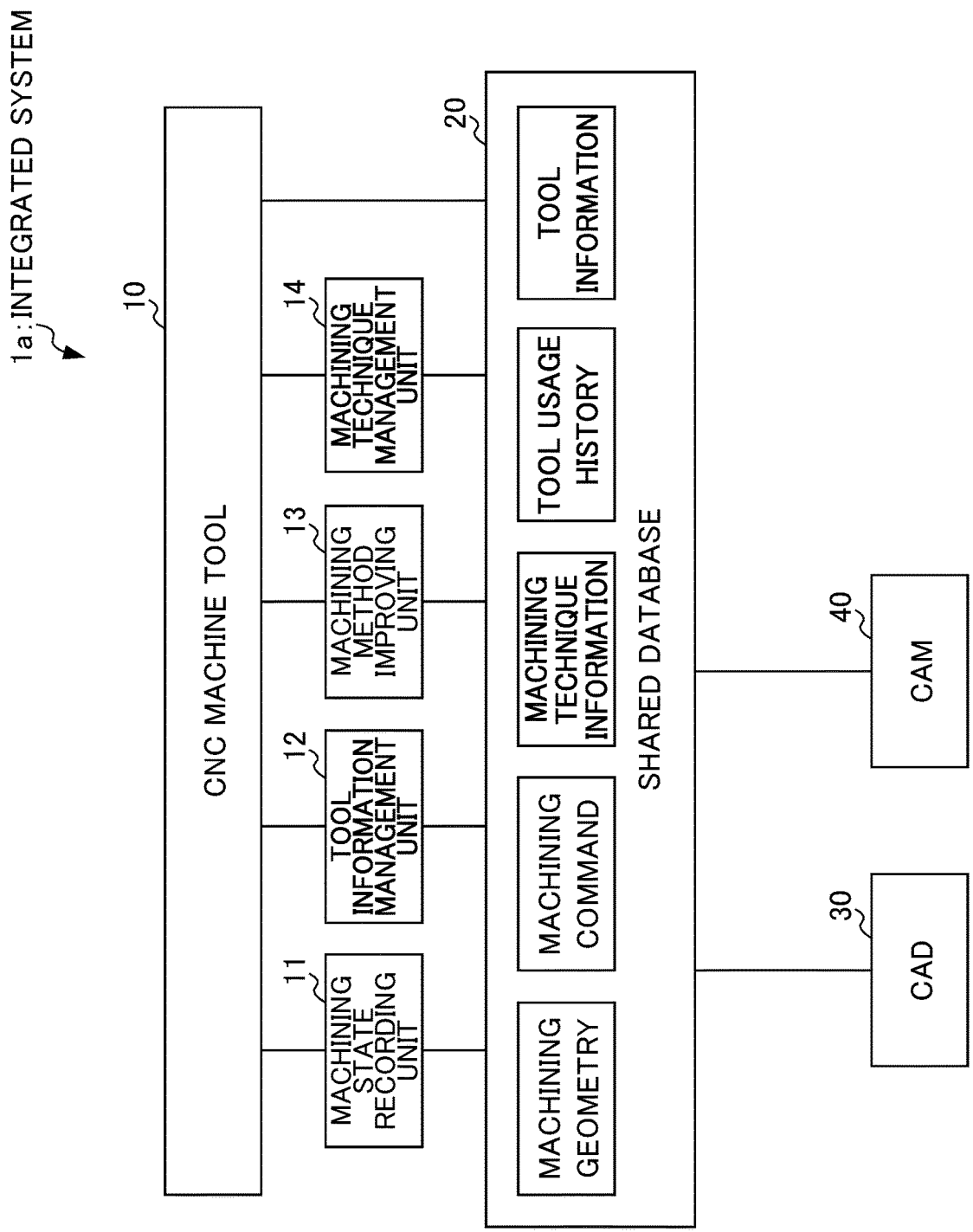
FIG. 9 is a block diagram showing a basic configuration according to a first modification of the present invention.
Figure 10:
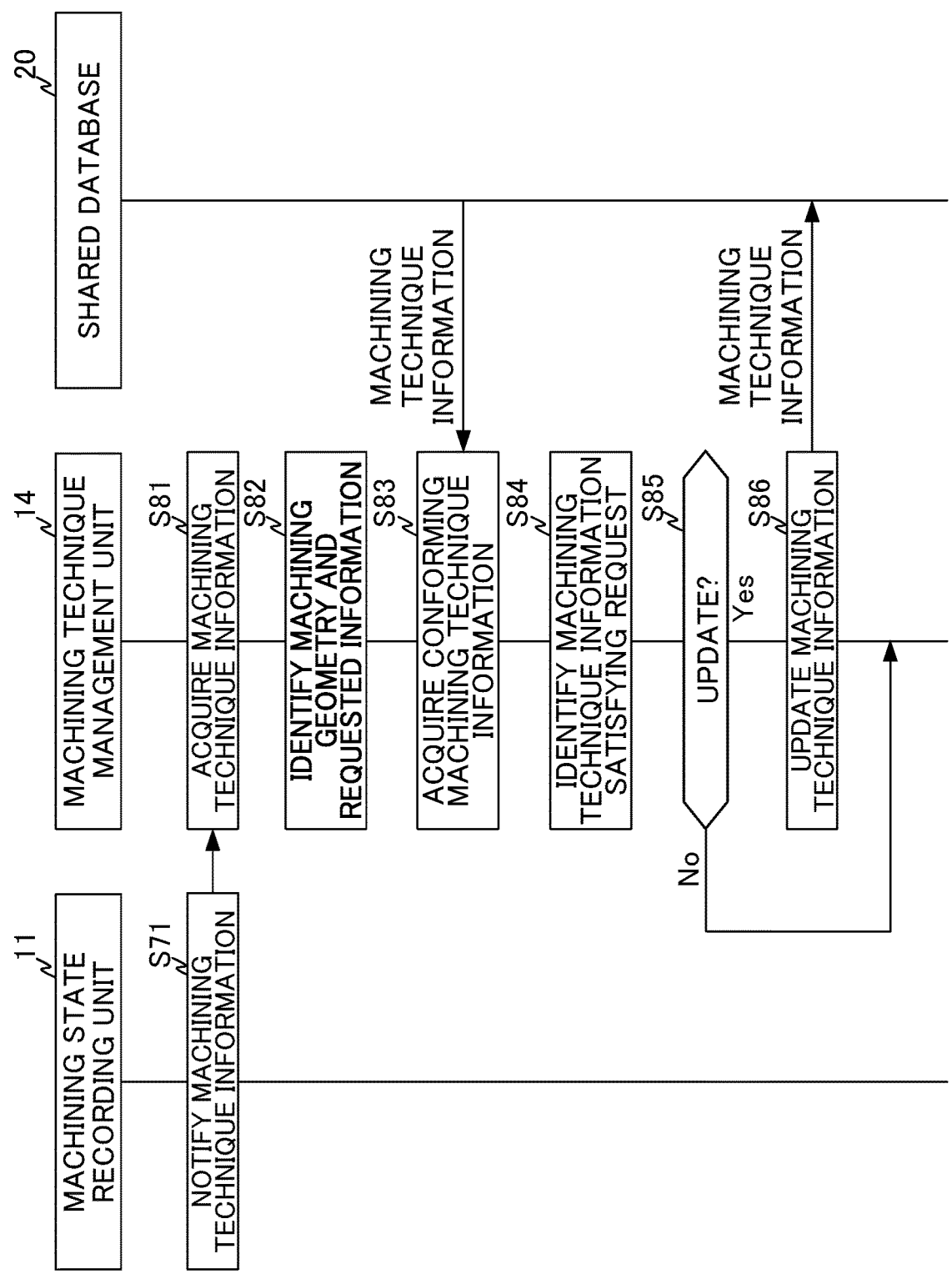
FIG. 10 is a sequence chart showing the flow of a process of storing machining technique information according to the first modification of the present invention.

A configuration according to a modification realizing this modified configuration will be described by referring to FIG. 9. As shown in FIG. 9, as a difference from the integrated system 1 according to the foregoing embodiment, an integrated system 1a according to this modification additionally includes a machining technique management unit 14. A process of storing machining technique information performed by the machining technique management, unit 14 forming the difference from the integrated system 1 according to the foregoing embodiment will be described by referring to the sequence chart of FIG. 10. Each time the machining state recording unit 11 newly generates machining technique information, the machining technique management unit 14 performs the process of storing the machining technique information.

First, the machining state recording unit 11 generates machining technique information in a manner described above by referring to FIG. 6. Then, in step S71, the machining state recording unit 11 notifies the machining technique management unit 14 of the generated machining technique information, not storing the generated machining technique information into the shared database 20.

In step S81, the machining technique management unit 14 acquires the notified machining technique information. In step S82, the machining technique management unit 14 identifies a machining geometry and machining request information included in the acquired machining technique information.

In step S83, the machining technique management unit 14 acquires machining technique information including a machining geometry at least partially the same as the identified machining geometry and conforming at least partially to the identified machining request information. The judgement criterion for "being the same at least partially" is the same as the judgment criterion shown in the foregoing description of step S63. As described above, according to this modification, only machining technique information most usable for achieving the highest satisfaction of a request in machining request information is stored into the shared database 20. For this reason, only one piece of machining technique information is acquired in this step.

In step S84, the machining technique management unit 14 determines which one of the new machining technique information notified in step S81 and the existing machining technique information acquired from the shared database 20 in step S83 is machining technique information most usable for achieving the highest satisfaction of a request in the conforming machining request information. The criterion for judging whether the request is satisfied is the same as the judgment criterion employed by the machining method improving unit 13 and shown in the foregoing description of step S64 of FIG. 8.

In step S85, the machining technique management unit 14 judges whether to update the machining technique information. More specifically, if the machining technique information achieving the highest satisfaction of the request in the machining request information is new machining technique information, the machining technique management unit 14 judges to update the machining technique information. In this case, a judgment Yes is made in step S85 and the process proceeds to step S86. If the machining technique information achieving the highest satisfaction of the request in the machining request information is existing machining technique information, the machining technique management unit 14 judges not to update the machining technique information. In this case, a judgment No is made in step S85 and then this process is finished.

In step S86, the machining technique management unit 14 updates the machining technique information. Namely, the machining technique management unit 14 replaces the existing machining technique information with the new machining technique information and stores the replaced machining technique information into the shared database 20. Then, this process is finished. The foregoing processes from step S82 to step S86 are performed for each machining step in the machining command.

According to this modification described above, the total number of pieces of machining technique information stored into the shared database 20 can be reduced. This allows a reduction in the volume stored in the shared database 20. According to this modification, the machining method improving unit 13 can omit the process of the determining machining technique information usable for achieving the highest satisfaction of a request. This allows a speed increase in the process by the machining method improving unit 13 to be performed before implementation of machining, so that the machining under an improved machining command can be started promptly.

Second Embodiment

As shown in FIG. 1, in the foregoing embodiment, the integrated system 1 includes one set formed of the CNC machine tool 10 and the machining state recording unit 11. This is not the only configuration. The integrated system 1 may include a plurality of sets each formed of the CNC machine tool 10 and the machining state recording unit 11. The shared database 20 may be shared by all of these sets. Configuring such a large-scale system allows collection of machining technique information of larger quantities.

The machining method improving unit 13 improves machining technique information on the basis of many pieces of machining technique information collected from these sets to provide machining technique information of higher quality. With this configuration, even at a CNC machine tool 10 managed by a different administrator, for example, machining technique information can still be improved on the basis of actual achievement of another CNC machine tool 10.

Third Modification

The contents in each piece of information stored in the shared database 20 in the foregoing embodiment are shown merely as examples. These contents can be subjected to addition of, replacement with, or change to different types of information freely, for example. As an example, the information "tool cost per unit time" is used in the foregoing embodiment as tool life is judged in terms of a period when a tool was used for machining. As an alternative to this, tool life may be judged in terms of a volume cut by machining, and information such as "tool cost per unit cutting volume" may be used, for example. In another case, tool life may be judged in terms of cutting energy, cutting load, or tool wear, for example, as an index to the tool life, and information corresponding to such pieces of information may be used.

Likewise, the judgment criterion in the foregoing embodiment for determining the machining technique information most usable for achieving the highest satisfaction of a request is shown merely as an example and can be subjected to addition of, replacement with, or change to a different judgment criterion freely, for example. In the foregoing embodiment, machining technique information conforming to an aim of machining included in machining request information is a target of judgment, for example. Alternatively, machining technique information to become a target of judgment may be machining technique information conforming to different pieces of information such as a raw material of a machining target, CAM tolerance, surface roughness, geometrical tolerance, and dimensional tolerance. As described above, information to be handled in the foregoing embodiment may be changed appropriately in response to an environment of implementation, user's need, etc.

EXPLANATION OF REFERENCE NUMERALS

1, 1*a* integrated system
10 CNC machine tool
11 Machining state recording unit
12 Tool information management unit
13 Machining method improving unit
14 Machining technique management unit
20 Shared database
30 CAD
40 CAM

What is claimed is:

1. A machining command improving system in an integrated system in which a CNC machine tool for machining of a machining target into a predetermined machining geometry on the basis of a machining command, wherein the CNC machine tool and a shared database are connected to each other, the machining command improving system being a system for improving the machining command, wherein the machining command improving system comprising:

a machining state recording unit that is configured to
start collection of information indicating a state of execution of the machining command on the basis of a first notification of a start of execution of machining by the machining command each time the CNC machine tool executes the machining command, the first notification being acquired from the CNC machine tool, the collection of the information indicating the state being performed for each machining step of a plurality of machining steps, and
generate machining technique information on the basis of the information indicating the state collected in each machining step of the plurality of machining steps, contents of the machining command executed in each machining step of the plurality of machining steps by the CNC machine tool, and tool information about a tool used in each machining step of the plurality of machining steps, and
register and accumulate the generated machining technique information in the shared database; and
a machining method improving unit, the machining method improving unit configured to
identify a machining geometry and machining request information included in an acquired machining command on the basis of a second notification of the acquired machining command for machining to be performed next, the second notification being acquired from the CNC machine tool,
acquire all pieces of the machining technique information, each including a machining geometry at least partially the same as the identified machining geometry and conforming at least partially to the identified machining request information,
determine the machining technique information from the acquired pieces of machining technique information achieving the highest satisfaction of a request in the machining request information conforming to the machining command,
improve the machining command by replacing the contents of the machining command with contents of the machining technique information achieving the highest satisfaction of the request in the machining request information, and
notify the improved machining command to the CNC machine tool to thereby cause the CNC machine tool to execute the machining on the basis of the improved machining command,
wherein the machining request information includes one or more of an aim of machining, a material of a machining target, CAM tolerance, surface roughness, geometrical tolerance, and dimensional tolerance,
wherein the machining state recording unit is configured to generate and store the machining technique information each time the machining command is executed by the CNC machine tool,
wherein pieces of the information indicating the state are collected for each machining step of the plurality of machining steps of the machining command, and
wherein the information indicating the state includes one or more of a servo information, a data information from various sensors, and a captured image showing a machining state.

2. The machining command improving system according to claim 1, further comprising a tool information management unit that is configured to identify either or both tool cost per unit time and tool life as the tool information on the basis of a usage history and an exchange history of the tool used for the machining, and is configured to register the tool information with the shared database, wherein
the machining state recording unit is configured to register the tool information with the shared database in further association with the machining request information and the information indicating the state.

3. The machining command improving system according to claim 1, wherein the machining method improving unit is configured to improve the machining command of the machining target at the CNC machine tool on the basis of the machining technique information achieving the highest satisfaction of the request in the machining request information.

4. The machining command improving system according to claim 1, wherein the machining command and the machining technique information include information about the machining geometry, and
the machining method improving unit is configured to improve the machining command of the machining target at the CNC machine tool on the basis of the machining technique information registered with the shared database, conforming at least partially to the machining request information, and including information about the machining geometry conforming at least partially to information about the identified machining geometry in the acquired machining command.

5. The machining command improving system according to claim 1, further comprising a machining technique management unit that is configured to compare the acquired pieces of the machining technique information conforming at least partially to the identified machining request information, and is configured to register only the machining technique information with the shared database achieving the highest satisfaction of the request in the machining request information.

6. The machining command improving system according to claim 1, wherein the machining request information includes information about the aim of the machining set by a user having calculated the machining command, and
conforming at least partially to the machining request information means that there is conformity at least in terms of the aim of the machining.

7. A machining command improving method implemented in an integrated system in which a CNC machine tool for machining of a machining target into a predetermined machining geometry on the basis of a machining command, wherein the CNC machine tool and a shared database are connected to each other, the machining command improving method being a method of improving the machining command, wherein the machining command improving method comprising:
a machining state recording step of
starting collection of information indicating a state of execution of the machining command on the basis of a first notification of a start of execution of machining by the machining command each time the CNC machine tool executes the machining command, the first notification being acquired from the CNC machine tool, the collection of the information indicating the state being performed for each machining step of a plurality of machining steps, and
generating machining technique information on the basis of the information indicating the state collected in each machining step of the plurality of machining steps, contents of the machining command executed in each machining step of the plurality of machining steps by the CNC machine tool, and tool information about a tool used in each machining step of the plurality of machining steps, and
registering and accumulating the generated machining technique information in the shared database; and
a machining method improving step, the machining method improving step
identifying a machining geometry and machining request information included in an acquired machining command on the basis of a second notification of the acquired machining command for machining to be performed next, the second notification being acquired from the CNC machine tool,
acquiring all pieces of the machining technique information, each including a machining geometry at least partially the same as the identified machining geometry and conforming at least partially to the identified machining request information,
determining the machining technique information from the acquired pieces of machining technique information achieving the highest satisfaction of a request in the machining request information conforming to the machining command,
improving the machining command by replacing the contents of the machining command with contents of the machining technique information achieving the highest satisfaction of the request in the machining request information, and
notifying the improved machining command to the CNC machine tool to thereby cause the CNC machine tool to execute the machining on the basis of the improved machining command,
wherein the machining request information includes one or more of an aim of machining, a material of a machining target, CAM tolerance, surface roughness, geometrical tolerance, and dimensional tolerance,
wherein the machining state recording step generates and stores the machining technique information each time the machining command is executed by the CNC machine tool,
wherein pieces of the information indicating the state are collected for each machining step of the plurality of machining steps of the machining command, and
wherein the information indicating the state includes one or more of a servo information, a data information from various sensors, and a captured image showing a machining state.

* * * * *